US009203826B1

(12) United States Patent
Margolis et al.

(10) Patent No.: US 9,203,826 B1
(45) Date of Patent: Dec. 1, 2015

(54) AUTHENTICATION BASED ON PEER ATTESTATION

(71) Applicant: Google Inc., Mountain View, CA (US)

(72) Inventors: Daniel Margolis, Burlington, CA (US);
Alon Altman, Mountain View, CA (US);
Oded Shahar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 14/191,353

(22) Filed: Feb. 26, 2014

(51) Int. Cl.
*H04L 29/06* (2006.01)

(52) U.S. Cl.
CPC ...................................... *H04L 63/08* (2013.01)

(58) Field of Classification Search
CPC ...................................................... H04L 63/08
USPC ............................................................. 726/7
See application file for complete search history.

(56) References Cited

U.S. PATENT DOCUMENTS

| 8,594,632 | B1* | 11/2013 | Azizi et al. ..................... 455/411 |
| 2004/0203598 | A1* | 10/2004 | Aerrabotu et al. ............. 455/411 |
| 2005/0122745 | A1* | 6/2005 | Sugiura ........................ 362/626 |
| 2006/0121923 | A1* | 6/2006 | East .............................. 455/518 |
| 2008/0183853 | A1* | 7/2008 | Manion et al. ................. 709/223 |
| 2009/0248665 | A1* | 10/2009 | Garg et al. ......................... 707/5 |
| 2010/0030858 | A1* | 2/2010 | Chasin .......................... 709/206 |
| 2010/0106781 | A1* | 4/2010 | Gupta ........................... 709/206 |
| 2010/0293600 | A1* | 11/2010 | Schechter et al. ................ 726/4 |
| 2012/0216260 | A1* | 8/2012 | Crawford et al. ................. 726/5 |
| 2012/0291137 | A1* | 11/2012 | Walsh et al. ..................... 726/26 |
| 2013/0024473 | A1* | 1/2013 | Krishnan et al. .............. 707/769 |
| 2014/0150072 | A1* | 5/2014 | Castro et al. ...................... 726/5 |
| 2014/0237570 | A1* | 8/2014 | Shishkov et al. ................ 726/7 |

OTHER PUBLICATIONS

Stuart Schechter et al., "It's Not What You Know, But Who You Know—A Social Approach to Last-Resort Authentication", dated Apr. 4-9, 2009, 10 pages.

* cited by examiner

*Primary Examiner* — Michael S McNally
(74) *Attorney, Agent, or Firm* — Patent Law Works, LLP

(57) ABSTRACT

A system and method for recovering an account based at least in part on peer attestation are disclosed. In some implementations, the system includes a trusted contact identifier module, a user interaction module, a trusted contact interaction module and a message generation module. The trusted contact identifier module analyzes a contact database of a user and identifies a selection of trusted contacts that satisfied a pre-defined criteria. The user interaction module presents the selection of trusted contacts and receives from the user an input including at least one selected trusted contact and a personalized message composed by the user. The trusted contact interaction module transmits the personalized message and a hyperlink for verifying the identity of the user to the at least one selected trusted contact and receives a response therefrom. The message generation module sends a message to the user in response to receiving the response.

20 Claims, 7 Drawing Sheets

AUTHENTICATION BASED ON PEER ATTESTATION

The specification relates to authentication, e.g., for account recovery.

BACKGROUND

Account recovery based at least in part on user authentication other than traditional credentials (i.e. username and password) may be desirable in at least two scenarios. The first scenario is when a user is unable to provide the correct password (because he/she forgot it or because it was changed by an attacker who accessed his/her account). The second scenario is when a user is attempting to authenticate in a suspicious manner (e.g. from a location he has never logged in from before) or has already authenticated and is behaving in a suspicious manner (e.g. by trying to then change the account's password and access options).

In these two scenarios, traditional credentials (e.g. passwords) alone are insufficient to prove a user's identity. Service may offer users the ability to configure additional out-of-band contacts (e.g., alternate email addresses, phone numbers) with which the user can prove his identity. However, a first problem is that many users do not configure these or may not have access to those channels anymore, and a second problem is that, in the situation where a malicious attacker has gained access to the user's initial account, the service provider cannot be certain that the attacker has not changed the additional out-of-band contacts and/or does not have access to the additional out-of-band endpoints.

SUMMARY

In some examples, the specification describes a system, method and computer program product for recovering an account based at least in part on peer attestation. In one example, the system comprises a trusted contact identifier module, a user interaction module, a trusted contact interaction module and a message generation module. The trusted contact identifier module analyzes a contact database of a user, wherein the contact database is associated with a user account and identifies a selection of trusted contacts, wherein the selection of trusted contacts satisfied a predefined criteria. In some implementations, the predefined criteria utilized by the trusted contact identifier module includes one or more of the frequency of communication between the user and the trusted contact, recentness of communication between the user and the trusted contact, two-way communication between the user and the trusted contact, the user's identified relationship with the trusted contact and how long the user has known the trusted contact.

The user interaction module presents the selection of trusted contacts and an instruction to select at least one of the contacts from the selection and receives an input from the user, wherein the input includes at least one selected trusted contact and a personalized message composed by the user, wherein the personalized message includes particular information of the user. In some implementations, the particular information of the user identifies the user to the at least one selected trusted contact. In some implementations, the input from the user received by the user interaction module further comprises one or more of an alternate contact method and a new password, which, subject to the at least one selected trusted contact attesting to the user's identity, enable the user to regain access to the user's account.

The trusted contact interaction module transmits the personalized message and a hyperlink to the at least one selected trusted contact, wherein the hyperlink directs the at least one selected trusted contact to a website for verifying the identity of the user, and receives a response from the at least one selected trusted contact. In some implementations, instead of, or in addition to, the hyperlink, the personalized message transmitted by the trusted contact interaction module includes instructions for the at least one selected trusted contact to send a specific message and the response received by the trusted contact interaction module includes whether the at least one selected trusted contact sends the specific message. In some implementations, the specific message includes a random string.

The message generation module sends a message to the user in response to receiving the response. In some implementations, the message sent to the user by the message generation module is sent using the alternate contact method. In some implementations, the message sent to the user by the message generation module is sent via one or more of a SMS message, instant message, a secondary e-mail and a telephone.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

Figure 1:
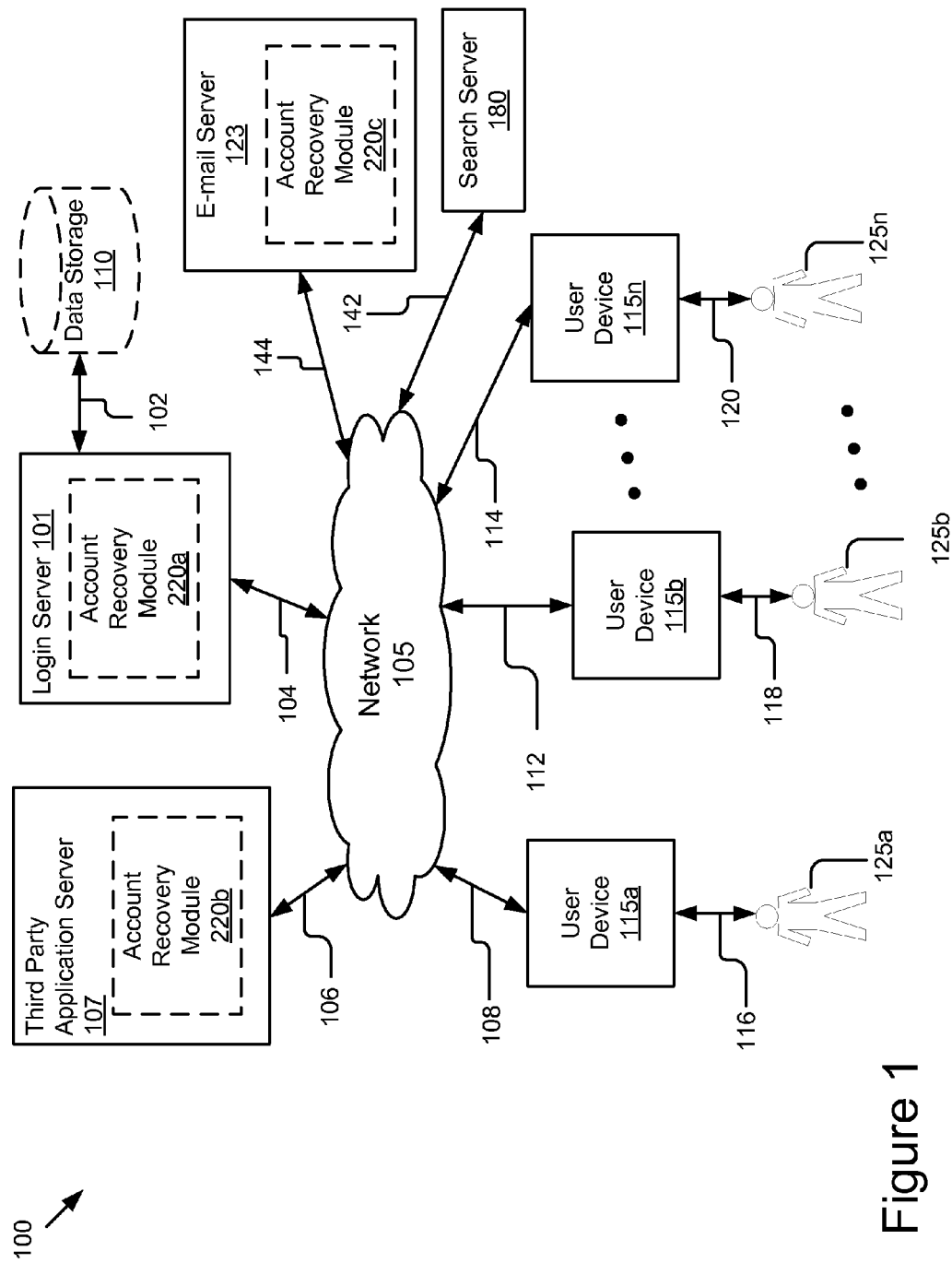
FIG. 1 illustrates a system for recovering an account based at least in part on peer attestation according to one implementation.

A system and method for recovering an account based at least in part on peer attestation is described. In the following description, for purposes of explanation, numerous specific details are set forth in order to provide a thorough understanding of the implementations. It will be apparent, however, to one skilled in the art that the implementations can be practiced without these specific details. In other instances, structures and devices are shown in block diagram form in order to avoid obscuring the implementations. For example, one implementation is described below with reference to user interfaces and particular hardware. However, the present implementations apply to any type of computing device that can receive data and commands, and any peripheral devices providing services.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The implementations can take the form of an entirely hardware implementation, an entirely software implementation or an implementation containing both hardware and software elements. An exemplary implementation is implemented in software, which includes but is not limited to firmware, resident software, microcode, etc.

Furthermore, the implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

FIG. 1 illustrates a block diagram of a system 100 for recovering an account based at least in part on peer attestation according to one implementation. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125), a login server 101, an e-mail server 123, a search server 180 and a third party application server 107. In the illustrated implementation, these entities are communicatively coupled via a network 105. Although only three user devices 115 are illustrated, any number of user devices 115 are available to any number of users 125.

The user devices 115 in FIG. 1 are used by way of example. While FIG. 1 illustrates three user devices 115, the present specification applies to any system architecture having one or more user devices 115. Furthermore, while only one network 105 is coupled to the user devices 115, the login server 101, the search server 180, the e-mail server 123 and the third party application server 107, in practice any number of networks 105 can be connected to the entities. Furthermore, while only one third party application server 107 is shown, the system 100 can include any number of third party application servers 107. Moreover, while only one e-mail server 123 and one search server 180 are shown, it will be recognized that multiple e-mail servers 123 and/or multiple search servers 180 may be present.

Although only one login server 101 is shown, it will be recognized that multiple login servers 101 may be present. In some implementations, the login server 101 comprises, or is comprised within a provider of one or more services including, but not limited to, e-mail, social networking, instant messaging and similar services in which a user 125 will have a history of interaction with other users. For example, the login server 101 is the login server for one or more of the services and/or is a server that provides one or more of the services. In some implementations, the login server 101 comprises, or is comprised within, a social network. A social network is any type of social structure where the users are connected by a common feature. Examples include, but are not limited to, blogs, microblogs and Internet forums. The common feature includes friendship, family, a common interest, etc. In another implementation, the login server 101 comprises, or is comprised within, an e-mailing service, which enables the users 125 to exchange e-mails within the system 100. For example, the login server 101 is the login server for an e-mail service, which also includes e-mail server 123. In yet another implementation, the login server 101 comprises, or is comprised within, an instant messaging service, which enables users 125 to instant message each other.

In some implementations, an account recovery module 220a is included in the login server 101 and is operable on the login server 101, which is connected to the network 105 via signal line 104. In another implementation, the account recovery module 220b is included in the third party application server 107 and is operable on the third party application server 107, which is connected to the network 105 via signal line 106. In yet another implementation, the account recovery module 220c is included in the e-mail server 123 and is operable on the e-mail server 123, which is connected to the network 105 via signal line 144. It will also be recognized that the account recovery module 2200a/220b/220c (referred to generally as the account recovery module 220) can be stored in any combination on the servers. In some implementations, the account recovery module 220 includes multiple, distributed modules that cooperate with each other to perform the functions described below. Details describing the functionality and components of the account recovery module 220 are explained in further detail below with regard to FIG. 3.

The network 105 enables communications between user devices 115, the login server 101, the e-mail server 123, the search server 180 and the third party application 107 server. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 105 can also include links to other networks.

In some implementations, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers). In some implementations, the network 105 is an IP-based wide or metropolitan area network.

In some implementations, the network 105 helps to form a set of online relationships between users 125, for example, those provided by one or more social networking systems including explicitly-defined relationships and relationships implied by social connections with other online users, where the relationships form a social graph. In some examples, the social graph can reflect a mapping of these users and how they are related.

In the illustrated implementation, the user devices 115a, 115b and 115n are coupled to the network 105 via signal lines 108, 112 and 114, respectively. The user 125a can interact with the user device 115a as illustrated by signal line 116. Similarly, the user 125b can interact with the user device 115b as illustrated by signal line 118, and the user 125n can interact with the user device 115n as illustrated by signal line 120. The third party application server 107 is communicatively coupled to the network 105 via signal line 106. The search server 180 is communicatively coupled to the network 105 via signal line 142. The e-mail server 123 is communicatively coupled to the network 105 via signal line 144. The login server 101 is communicatively coupled to the network 105 via signal line 104. In some implementations, the login server 101 is communicatively coupled to data storage 110 via signal line 102.

In some implementations, the data storage 110 stores data and information of users 125 of the system 100. In some implementations, the information stored in data storage 110 includes the user's list of current and past contacts and the user's activities within the system 100, including, for example, anything the user posts within the system 100 and any messages that the user sends to other users and/or receives from other users. In some implementations, the user's list of current and past contacts is a contact database. In some implementations, which is discussed below, a storage device 214 (see FIG. 2) is included in the login server 101 (i.e., a computing device 200) and the storage device 214 stores the data and information of users 125 of the login server 101.

In some implementations, the user device 115 is an electronic device having a web browser for interacting with the various servers 101, 107, 123, 180 and user devices 115 of the system 100 via the network 105 and is used by a user 125 to access information in the system 100. The user device 115 can be, for example, a laptop computer, a desktop computer, a tablet computer, a mobile telephone, a personal digital assistant (PDA), a mobile email device, a portable game player, a portable music player or any other electronic device capable of accessing a network. One having ordinary skill in the art will recognize that other types of client devices 115 are possible. In some implementations, the system 100 comprises a combination of different types of client devices 115. For example, a combination of a personal computer, a mobile phone and a tablet computer. The user 125 is a human user of the user device 115.

Computing Device 200

Figure 2:
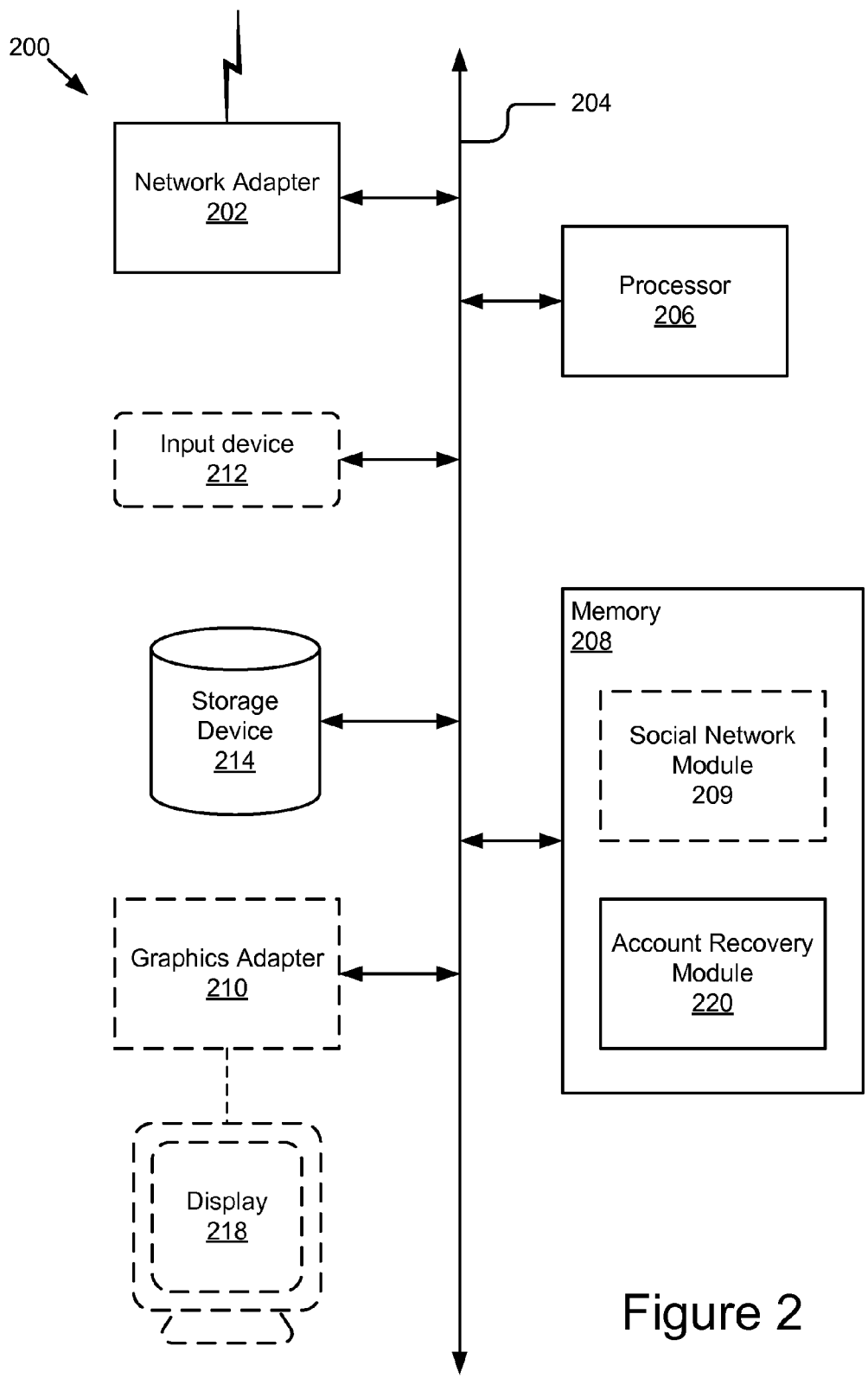
FIG. 2 is a block diagram illustrating a computing device according to one implementation.

FIG. 2 is a block diagram of an implementation of a computing device 200 according to one implementation. As illustrated in FIG. 2, the computing device 200 includes a network adapter 202 coupled to a bus 204. According to one implementation, also coupled to the bus 204 are at least one processor 206, memory 208, a graphics adapter 210, an input device 212 and a storage device 214. In some implementations, the memory 208 comprises an account recovery module 220 and an optional social network module 209. In some implementations, the functionality of the bus 204 is provided by an interconnecting chipset. The computing device 200 also includes a display 218, which is coupled to the graphics adapter 210.

The processor 206 may be any general-purpose processor. The processor 206 comprises an arithmetic logic unit, a microprocessor, a general purpose controller or some other processor array to perform computations and execute code and routines. The processor 206 is coupled to the bus 204 for communication with the other components of the computing device 200. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. It will be obvious to one skilled in the art that other processors, operating systems, sensors, displays and physical configurations are possible.

The memory 208 is a non-transitory storage medium. The memory 208 holds instructions and/or data that may be executed by the processor 206. In some implementations, the instructions and/or data stored on the memory 208 comprise code for performing any and/or all of the techniques described herein. The memory 208 may be a dynamic random access memory (DRAM) device, a static random access memory (SRAM) device, flash memory or some other memory device known in the art. In some implementations, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the computing device 200. In some implementations, the account recovery module 220 is stored in memory 208 and executable by the processor 206. In some implementations, the optional social network module 209 is stored in memory 208 and executable by the processor 206.

The computing device 200, in some implementations, is a login server 101. In one such implementation, the login server 101 contains the social network module 209. The social network module 209 is software and routines executable by the processor 206 to control the interaction between the login server 101, storage device 214 and the user devices 115. An implementation of the social network module 209 allows users 125 of user devices 115 to perform social functions between other users 125 of user devices 115 within the system 100. In another implementation, the computing device 200 is a third party application server 107. In yet another implementation, the computing device 200 is an e-mail server 123.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In some implementations, the storage device stores data and information of users 125 of the computing devices. For example, the user data and information discussed above in reference to data storage 110.

The input device 212 may include a mouse, track ball, or other type of pointing device to input data into the computing device 200. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to a local or wide area network.

The account recovery module 220 is code and routines executable by the processor 206 for recovering an account based at least in part on peer attestation. In some implementations, the account recovery module 220 is a set of instructions executable by the processor 206. In another implementation, the account recovery module 220 is stored in the memory 208 and is accessible and executable by the processor 206. Details describing the functionality and components of the account recovery module 220 are explained in further detail below in reference to FIG. 3.

As is known in the art, a computing device 200 can have different and/or other components than those shown in FIG. 2. For example, the computing device can have speakers or another form of audio output (not shown). In addition, the computing device 200 can lack certain illustrated components. For example, in some implementations, the computing device 200 is a login server 101 and lacks an input device 212, graphics adapter 210 and/or display 218. Moreover, the storage device 214 can be local and/or remote from the computing device 200 (e.g., a storage area network (SAN)).

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In some implementations, program modules are stored on the storage device 214, loaded into the memory 208 and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Account Recovery Module 220

Figure 3:
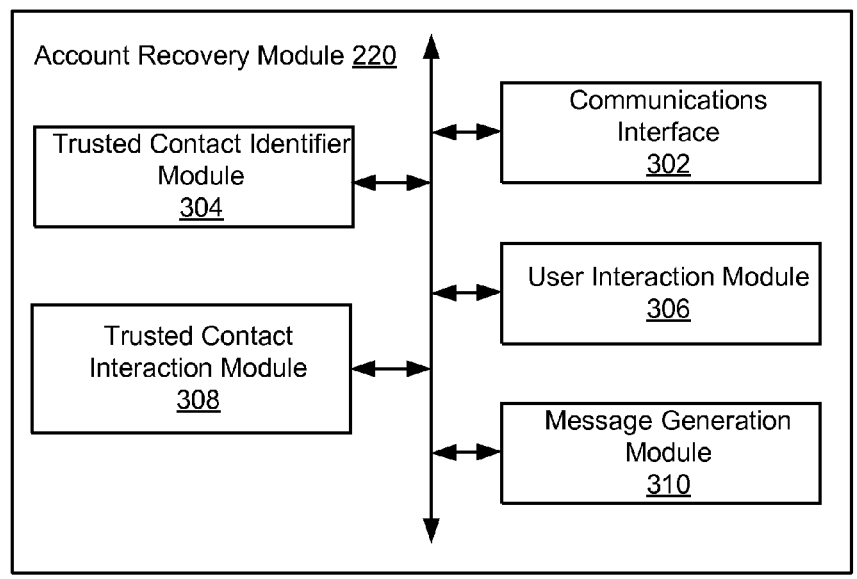
FIG. 3 is a block diagram illustrating an account recovery module according to one implementation.

Referring now to FIG. 3, the account recovery module 220 is shown in more detail according to one implementation. FIG. 3 is a block diagram of the account recovery module 220 included in a computing device 200 (e.g., a login server 101).

In some implementations, the account recovery module 220 comprises a communications interface 302, a trusted contact identifier module 304, a user interaction module 306, a trusted contact interaction module 308 and a message generation module 310.

It will be recognized that the modules 302, 304, 306, 308, 310 comprised in the account recovery module 220 are not necessarily all on the same computing device 200. In some implementations, the modules 302, 304, 306, 308, 310 are distributed across multiple computing devices 200. For example, in some implementations, the trusted contact identifier module 304 is included in the e-mail server 123 and the other modules 302, 306, 308, 310 are included in the login server 101. It will be recognized that the preceding is just an example of distributing modules across multiple computing devices 200 and that other examples exist.

The communication interface 302 is code and routines for handling communications between the trusted contact identifier module 304, the user interaction module 306, the trusted contact interaction module 308, the message generation module 310 and other components of the computing device 200. In some implementations, the communication interface 302 is a set of instructions executable by the processor 206. In another implementation, the communication interface 302 is stored in the memory 208 and is accessible and executable by the processor 206. In either implementation, the communication interface 302 is adapted for cooperation and communication with the processor 206, other components of the computing device 200 and other components of the account recovery module 220.

The communication interface 302 handles communications between the trusted contact identifier module 304, the user interaction module 306, the trusted contact interaction module 308, the message generation module 310 and other components of the computing device 200. For example, the communication interface 202 communicates with the trusted contact identifier module 304 and the user interaction module 306 to pass the output of the trusted contact identifier module 304 (i.e., one or more identified trusted contacts) to the user interaction module 306. However, this description may occasionally omit mention of the communication interface 302 for purposes of clarity and convenience. For example, for purposes of clarity and convenience, the above scenario may be described as the trusted contact identifier module 304 passing one or more identified trusted contacts to the user interaction module 306.

The trusted contact identifier module 304 is code and routines for identifying one or more trusted contacts. In some implementations, the trusted contact identifier module 304 is a set of instructions executable by the processor 206. In some implementations, the trusted contact identifier module 304 is stored in the memory 208 and is accessible and executable by the processor 206. In either implementation, the trusted contact identifier module 304 is adapted for cooperation and communication with the processor 206, other components of the computing device 200 and other components of the account recovery module 220.

The trusted contact identifier module 304 identifies one or more trusted contacts. The one or more identified contacts are occasionally referred to herein as a "selection of trusted contacts." In some implementations, a trusted contact is a contact that is likely to be able to accurately verify the user's identity. For example, assume that one of the user's contacts is a close friend, the close friend is likely to be able to accurately verify the user's identity, since typically close friends are able to identify one another. A trusted contact verifying the identity of the user is occasionally referred to herein as a "peer attestation" or a trusted contact "attesting" to the user's identity.

The trusted contact identifier module 304 may identify the one or more trusted contacts responsive to any number of events. For example, events include, but not limited to, a user requesting account recovery, a user logging off from a service and/or server (e.g., logging of from a social network service provided by login server 101), periodically (e.g., every week), etc. It will be recognized that the preceding are merely examples of events that can trigger the identification of one or more trusted contacts and that other events exist.

In some implementations, the trusted contact identifier module 304 identifies the selection of trusted contacts by analyzing a contact database associated with the user's account and identifying one or more contacts from the contact database based at least in part on one or more criteria being satisfied. Examples of criteria include, but are not limited to, one or more of the frequency of communication between the user and the contact, recentness of communication between the user and the contact, whether the communication between the user and the contact was two-way, the user's identified relationship with the contact, how long the user has known the contact, etc. It will be recognized that the preceding are merely examples of criteria and that other criteria exist.

In some implementations, the one or more criteria are predefined. For example, the one or more criteria and/or their relative weightings are defined by a system administrator of the computing device 200 comprising the account recovery module 220 (e.g. a login server 101) prior to an event (e.g. a request for account recovery). For another example, the user 125 sets the one or more criteria and/or their relative weightings in the user's account settings. In one such example, a feedback mechanism presents the selection of trusted contacts to the user based on the user defined criteria and/or weightings so that the user can ensure that user is comfortable with the contacts or types of contacts that may be included in the selection of trusted contacts.

In some implementations, a trusted contact is identified based at least in part on the frequency of communication between the user and the contact. For example, assume that a contact that is frequently communicating with the user is more likely to be able to accurately verify the user's identity, in some implementations, the trusted contact identifier module 304 identifies one or more contacts that frequently communicate with the user as trusted contacts. In some implementations, the frequency of communication must satisfy a threshold test. For example, sending communications to and/or receiving communications from the contact more than twice per month. It will be recognized that the preceding is merely an example of a threshold and that other thresholds exist. For example, the time interval may be measured by hour(s), day(s), week(s), month(s), year(s) or a percentage of the existence of the user's account. For another example, the number of communications necessary during the time interval may be different. In some implementations, the trusted contact identifier module 304 identifies the one or more contacts that have the highest communication frequency as trusted contacts. For example, the trusted contact identifier module 304 identifies the five contacts that have most frequently communicated with the user 125 in the preceding month.

In some implementations, a trusted contact is identified based at least in part on the recentness of communication between the user and the contact. For example, assume that a contact that recently communicated with the user is more likely to be able to accurately verify the user's identity, because, for example, the user may reference a recent communication in a personalized message to verify his/her identity to the contact. In some implementations, the trusted contact identifier module 304 identifies one or more contacts that recently communicated with the user as trusted contacts. In some implementations, the frequency of communication must satisfy a threshold test. For example, the contact must have communicated with the user in the previous week. For another example, the contact must have been the sender or recipient of one of the last ten communications sent and/or viewed by the user.

In some implementations, a trusted contact is identified based at least in part on whether the communication between the user and the contact two-way. For example, assume that a contact that has participated in two-way communications with the user (e.g., the contact has sent communications to the user and has received communications from the user) is more likely to be able to accurately verify the user's identity, in some implementations, the trusted contact identifier module 304 identifies one or more contacts that have participated in two-way communication with the user as one or more trusted contacts.

In some implementations, a trusted contact is identified based at least in part on the user's identified relationship with the contact. For example, assume that a contact that has a closer relationship with the user is more likely to be able to accurately verify the user's identity, in some implementations, the trusted contact identifier module 304 identifies one or more contacts that have a close relationship with the user as trusted contacts. Contacts that have close relationship with the user may include but are not limited to one or more of parents, siblings and other relatives, close friends, significant others, roommates, co-workers etc. In some implementations, the identified relationship is user identified. For example, the user identifies a contact as the user's significant other. In some implementations, the identified relationship is identified at least in part using the social graph. For example, the social graph of a social network is used to identify one or more contacts with which the user has a close relationship. In some implementations, the identified relationship is identified at least in part using the domain name of an e-mail address. For example, assume that User A routes e-mails from his corporate e-mail account, userA@company1.com, to his personal e-mail account, in some implementations, a contact of User A that has an @company1.com e-mail address is identified as a co-worker. It will be recognized that the preceding are merely examples of identifying a user's relationship with a contact and that other examples exist.

In some implementations, a trusted contact is identified based at least in part on how long the user has known the contact. For example, assume that older contacts are more likely to be able to accurately verify the identity of the user because, for example, those contacts have known the user for longer, in some implementations, the trusted contact identifier module 304 identifies one or more contacts that have known the contact for a long(er) time. In some implementations, the length of time between the first communication between the user and contact and the time when the trusted contact identifier module 304 identifies one or more contacts is subject to a threshold test. For example, the first communication between the contact and the user must have occurred more than 3 months prior to the user's account recovery request to satisfy the duration threshold test. It will be recognized that the preceding is merely an example of a duration threshold and that other duration thresholds exist. For example, the duration used may be hour(s), day(s), week(s), month(s), year(s) or a percentage of the existence of the user's account.

In some implementations, how long the contact has known the user is based in part on both the time of the first communication between the user and contact and whether the contact and user continue to communicate. For example, in some implementations, a contact must have communicated with the user for the first time more than 3 months prior to the account recovery request and must have continued to communicate with the user in order to be identified by the trusted contact identifier module 304 as a trusted contact. It will be recognized that the determination of whether a user and contact are still communicating may be achieved in multiple ways. Examples of ways of determining whether a contact and user are still communicating include, but are not limited to, whether the contact and user have recently communicated (e.g., within the last month), whether there is a pattern of communication between the user and contact (e.g., once every couple weeks or every year around Christmas), etc. It will be recognized that the preceding are merely examples of determining continuing communication between a contact and a user and that other examples exist.

In some implementations, the trusted contact identifier module 304 passes the selection of trusted contacts to the user interaction module 306. For example, the trusted contact identifier module 304 is communicatively coupled to the user interaction module 306 to send the selection of trusted contacts to the user interaction module 306. In another implementation, the trusted contact identifier module 304 (or the communication interface 302) stores the selection of trusted contacts in the storage device 214 (or any other non-transitory storage medium communicatively accessible). The other modules of the account recovery module 220 including the user interaction module 306 can retrieve the selection of trusted contacts by accessing the storage device 214 (or other non-transitory storage medium).

The user interaction module 306 is code and routines for interacting with the user. In some implementations, the user interaction module 306 is a set of instructions executable by the processor 206. In another implementation, the user interaction module 306 is stored in the memory 208 and is accessible and executable by the processor 206. In either implementation, the user interaction module 306 is adapted for cooperation and communication with the processor 206, other components of the computing device 200 and other components of the account recovery module 220.

The user interaction module 306 interacts with the user. In some implementations, the user interaction module 306 interacts with the user by presenting data and information to the user and receiving input from the user. For example, the user interaction module 306 presents the selection of trusted contacts and receives input comprising at least one selected trusted contact and a private message composed by the user.

In some implementations, the user interaction module 306 presents data and information to the user. In some implementations, the user interaction module 306 presents data and information by generating graphical user interface (GUI) data that is sent to the user's user device 115 and causes the user device 115 to display a GUI comprising the data and information to the user. In some implementations, the data and information presented to the user includes one or more of the selection of trusted contacts, instructions to select at least one trusted contact from the selection, a means for selecting at least one trusted contact from the selection and an interface for receiving a personalized message composed by the user.

In some implementations, the data and information presented to the user includes the selection of trusted contacts. For example, the selection of trusted contacts is listed or presented in another format in a GUI by one or more of name, screen/user name, alias, e-mail address and another type of identifying information. In some implementations, the data and information presented to the user includes an interface for selecting at least one trusted contact from the selection of trusted contacts. For example, the GUI includes one or more of a button, a check box, a pull-down menu, a hyperlink and another means of selecting at least one trusted contact.

In some implementations, the data and information presented to the user includes instructions for selecting at least one of the contacts from the selection of trusted contacts. For example, the GUI includes "Select the contact(s) you would like to request assistance from in recovering your account by checking the box next to the contact(s)" or other instructional text.

In some implementations, the data and information presented to the user includes an interface for receiving a personalized message composed by the user. For example, the GUI includes a text box for the user to compose a personalized message. For another example, the GUI includes an interface for the user to upload a file including a personalized message. The personalized message may take one or more forms depending upon the implementation. In some implementations, the personalized message performs one or more function including notifying the at least one selected trusted contact, identifying the user to the at least one selected trusted contact, proving the identity of the user to the at least one selected trusted contact and instructing the at least one selected trusted contact.

In some implementations, the personalized message identifies the user to the trusted contact. For example, in some implementations, the personal message composed by the user may include personal information about one or more of what the user knows, what the user has and what the user is. For example, "It's me, Ted. I know that you keep a secret stash of chocolate in your top drawer," which, if true, identifies and proves that the user is the user associated with the account (i.e. Ted) based on particular information that the user knows (i.e. that there's a secret stash of chocolate in the top drawer). For another example, "Hi. It's Ted. I have the other half of the heart-shaped charm and it is red," which, if true identifies and proves that the user is the user associated with the account (i.e. Ted) based on particular information of what the user has (i.e. the other half of the charm that is red). For yet another example, "Hey, there. It's Ted. I am Mary's secret Santa," which, if true, identifies and proves that the user is the user associated with the account (i.e. Ted) based on particular information of what the user is (i.e. Mary's secret Santa). It will be recognized that the preceding are merely examples of particular information about what the user knows, what the user has and what the user is and that other examples exist.

In some implementations, the personalized message notifies the at least one selected trusted contact of the user's situation. For example, the personalized message includes text such as "I can't remember my password and I need your help to regain access to my e-mail account."

In some implementations, the personalized message instructs the at least one selected trusted contact. For example, the personalized may include instructions such as, "Give me a call, so you know this is actually me sending you this. Then follow the attached instructions to help me regain access to my account."

The personalized message is not necessarily textual. In some implementations, for example, the personalized message may be, or include, one or more of text, a photograph and an audio recording. For example, a personalized message may comprise one or more of a photo of the user's face next to the front page of the day's newspaper and a voice recording of the user explaining the user's predicament.

In some implementations, the data and information presented to the user comprise an interface for the user to specify an alternate contact method by which to receive a message allowing the user to recover his/her account. Examples of alternate contact methods include but are not limited to short message service (SMS), instant message, a secondary e-mail, telephone, etc. For example, assume the interface includes a pull-down menu and text fields, in some implementations, the user selects the alternate contact method as SMS using the pull-down menu and enters a cellphone number in the text field. Allowing the user to input an alternate contact method when the user needs to recover the account beneficially ensures that the contact method is not one or more of inconvenient, outdated and unusable.

In some implementations, the data and information presented to the user comprise an interface for the user to specify the method of transmitting the personalized message to the at least one selected trusted contact. For example, assume the user knows that the best way of reaching the at least one selected trusted contact is via e-mail because the at least one selected trusted contact regularly checks his/her e-mail, in some implementations, the GUI allows the user to select to transmit the personalized message via e-mail to the at least one selected trusted contact.

In some implementations, the data and information presented to the user comprise an interface for the user to specify a new password. For example, assume the interface includes a text field, in some implementations, the user enters a new password in the text field, which the user can use to regain access to the user's account (i.e., recover the account) subject to the response from the at least one selected trusted contact.

In addition to presenting data and information to the user, the user interaction module 306 also receives input from the user. The input received from the user includes at least one selected trusted contact and a personalized message composed by the user. In some implementations, the input may further include one or more of an alternate contact method, a new password and a specified transmission method. In some implementations, the user interaction module 306 receives input from the user through a GUI. For example, the user using a GUI selects at least one trusted contact, composes a personalized message and optionally provides an alternative contact method, which is received by the user interaction module 306.

In some implementations, the user may select a plurality of trusted contacts. For example, assume that multiple peer attestations are required to verify the user's identity and recover the user's account, in one such implementation, the user may be required to select 4 trusted contacts, which is received as input from the user, and be verified by at least 2, or 3, of the 4 selected trusted contacts in order to recover the user's account.

In some implementations where the user selects a plurality of trusted contacts, the user interaction module 306 presents data and information to the user and receives input from the user that allows the user to create multiple personalized messages. For example, the GUI allows the user to input a personalized message composed by the user for each selected trusted contact or to input multiple personalized messages composed by the user and specify which trusted contacts receive which personalized message.

In some implementations, the user interaction module 306 passes user input to one or more of the trusted contact interaction module 308 and the message generation module 310. For example, the user interaction module 306 is communicatively coupled to one or more of the trusted contact interaction module 308 and the message generation module 310 to send the user input in whole or in part to one or more of the trusted contact interaction module 308 and the message generation module 310. In another implementation, the user interaction module 306 (or the communication interface 302) stores the user input in the storage device 214 (or any other non-transitory storage medium communicatively accessible). The other modules of the account recovery module 220 including the trusted contact interaction module 308 and/or the message generation module 310 can retrieve the user input by accessing the storage device 214 (or other non-transitory storage medium).

The trusted contact interaction module 308 is code and routines for interacting with the at least one selected trusted contact. In some implementations, the trusted contact interaction module 308 is a set of instructions executable by the processor 206. In another implementation, the trusted contact interaction module 308 is stored in the memory 208 and is accessible and executable by the processor 206. In either implementation, the trusted contact interaction module 308 is adapted for cooperation and communication with the processor 206, other components of the computing device 200 and other components of the account recovery module 220.

In some implementations, the trusted contact interaction module 308 receives the personalized message and at least one selected trusted contact from the user interaction module 306. In another implementation, the trusted contact interaction module 308 retrieves the personalized message and at least one selected trusted contact from the storage device 214 (or other non-transitory storage medium). In either implementation, the trusted contact interaction module 308 interacts with the at least one selected trusted contact by transmitting the personalized message to the at least one selected trusted contact and receiving a response from the at least one selected trusted contact.

The personalized message may be transmitted by the trusted contact interaction module 308 using any number of methods. Examples of transmission methods include but are not limited to one or more of e-mail, phone, SMS, instant message, etc. It will be recognized that the preceding are merely examples of transmission methods and that other examples exist. In some implementations, the transmission of the personalized method by the trusted contact interaction module 308 is based at least in part on the contact information associated with the at least one selected trusted contact in the contact database. For example, assume the selected trusted contact is associated with an e-mail address, in some implementations, the personalized message is transmitted to the selected trusted contact by the trusted contact interaction module 308 via e-mail. For another example, assume the selected trusted contact is associated with a cellphone number, in some implementations, the personalized message may be transmitted by the trusted contact interaction module 308 via an SMS text message.

In some implementations, only one method of transmission is used by the trusted contact interaction module 308. For example, the personalized message will only be sent by the trusted contact interaction module 308 via e-mail. In one such implementation, the predetermined criteria may include that the contact is associated with an e-mail address in order to be identified as a trusted contact. In another implementation, multiple methods of transmission are used to contact a selected trusted contact. For example, the transmission is sent via e-mail and SMS to a single selected trusted contact. In some implementations, a plurality of transmission methods are used to transmit to a plurality of selected trusted contacts. For example, an e-mail transmission is sent to a first trusted contact and an SMS transmission is sent to a second trusted contact.

In some implementations, the transmission methods used by the trusted contact interaction module 308 have a hierarchy. For example, the personalized message will be transmitted by the trusted contact interaction module 308 via e-mail if associated with an e-mail address, and, if no e-mail address is associated with the selected trusted contact, via a social network message if the selected trusted contact is associated with a social network profile.

In some implementations, the personalized message is transmitted by the trusted contact interaction module 308 through all available methods. For example, assume the selected trusted contact's contact information includes an e-mail address and a cellphone number, in some implementations, the trusted contact interaction module 308 transmits the personalized message via both e-mail and SMS. Such implementations may beneficially ensure a faster response by the at least one selected trusted contact.

In some implementations, the personalized message is transmitted via a method specified by user input received by the user interaction module 306. For example, the user specified that the selected trusted contact should be contacted via SMS text message because the user knows the selected trusted contact always carries a cellphone, so the trusted contact interaction module 308 transmits the personalized message to the selected trusted contact via SMS. Such implementations may beneficially ensure a faster response by the at least one selected trusted contact by leveraging a user's knowledge of the at least one selected trusted contact's habits.

The trusted contact interaction module 308 transmits the personalized message composed by the user to the at least one selected trusted contact. In some implementations, the user may have selected a plurality of trusted contacts, in one such implementation, the trusted contact interaction module 308 transmits a different personalized message to one or more of the trusted contacts comprising the plurality. For example, each trusted contact receives a different personalized message, or a first portion of the plurality receive a first personalized message and a second portion of the plurality receive a second personalized message.

In some implementations, the trusted contact interaction module 308 transmits additional information to the at least one selected trusted contact with the personalized message. Examples of additional information include but are not limited to one or more of instructions, a hyperlink and a specific message. It will be recognized that the preceding are merely examples of additional information which may be transmitted with the personalized message and that other examples exist.

In some implementations, the additional information transmitted to the at least one selected trusted contact includes instructions. For example, the trusted contact interaction module 308 transmits a set of instructions to the at least one selected trusted contact describing the steps the at least one selected trusted contact must perform to attest to the user's identity. In some implementations, the instructions include one or more warnings. For example, the instructions warn the at least one selected trusted contact to attest to the user's identity only when the trusted contact is confident that the personalized message is from the user.

In some implementations, the additional information transmitted to the at least one selected trusted contact includes a hyperlink. For example, assume the trusted contact interaction module 308 transmits a hyperlink with the personalized message. In some implementations, the hyperlink includes an identifier unique to the recovery request as a whole and/or unique to the authentication challenge for that trusted contact (e.g., when a plurality of trusted contacts are selected by the user and/or required for account recovery). For example, the hyperlink includes a unique nonce. In some implementations, the hyperlink directs the at least one selected trusted contact to a website where the at least one selected trusted contact may attest to the identity of the user. For example, the hyperlink directs the at least one selected trusted contact to a website where the at least one selected trusted contact is instructed to press an "Okay" button if the at least one selected trusted contact is confident that the personalized message is from the user.

In some implementations, the additional information transmitted to the at least one selected trusted contact includes a specified message. For example, the specific message is a random string generated by the trusted contact interaction module 308, which the user must send in order to attest to the user's identity. Examples of sending a specific message include but are not limited to one or more of e-mailing the specific message to a specified e-mail address, instant messaging the specific message to a specified recipient, publicly posting the specific message on a social network, etc. It will be recognized that the preceding are merely an example of a specific message and sending a specific message and that other examples exist.

In addition to transmitting the personalized message, the trusted contact interaction module 308 receives a response from the at least one selected trusted contact. In some implementations, trusted contact interaction module 308 receives a response when a trusted contact attests to the user's identity (i.e., the trusted contact has verified that the user is who the user claims to be). In some implementations, the trusted contact interaction module 308 receives a response whether the trusted contact attests to the user's identity or not.

The response received by the trusted contact interaction module 308 may take different forms depending upon the implementation. For example, assume the trusted contact interaction module 308 transmitted a specific message with the personalized message to the at least one selected trusted contact, in some implementations, the response received by the trusted contact interaction module 308 is whether the at least one selected trusted contact sent the specific message. For example, the trusted contact interaction module 308 determines whether it has received an e-mail including the random string (i.e. a response) from the at least one selected trusted contact and/or analyzes the social network posts of the at least one selected trusted contact and determines whether the random string has been publicly posted by the at least one trusted contact (i.e. a response). For another example, assume the trusted contact interaction module 308 transmitted a hyperlink to the at least one selected trusted contact that directs the at least one selected trusted contact to a website where the at least one selected trusted contact may verify the identity of the user by clicking on an "Okay" button, in some implementations, the user's interaction with the website (i.e. clicking the okay button) is a response received by the trusted contact interaction module 308. It will be recognized that the preceding are merely examples of responses and that other examples exist.

In some implementations, the trusted contact interaction module 308 passes the response to the message generation module 310. For example, the trusted contact interaction module 308 is communicatively coupled to the message generation module 310 to send the response to the message generation module 310. In another implementation, the trusted contact interaction module 308 (or the communication interface 302) stores the response in the storage device 214 (or any other non-transitory storage medium communicatively accessible). The other modules of the account recovery module 220 including the message generation module 310 can retrieve the response by accessing the storage device 214 (or other non-transitory storage medium).

The message generation module 310 is code and routines for generating and sending a message to the user based at least in part on the response of the at least one selected trusted contact. In some implementations, the message generation module 310 is a set of instructions executable by the processor 206. In another implementation, the message generation module 310 is stored in the memory 208 and is accessible and executable by the processor 206. In either implementation, the message generation module 310 is adapted for cooperation and communication with the processor 206, other components of the computing device 200 and other components of the account recovery module 220.

The message generation module 310 generates and sends a message to the user based at least in part on the response of the at least one selected trusted contact. The message may serve one or more of notice to the user regarding the status of the user's verification (or lack thereof) by at least one selected trusted contact and to enable the user to recover the user's account depending upon the implementation. It will be recognized that the message may further serve additional or different functions.

In some implementations, the message serves notice to the user. For example, assume the trusted contact did not verify the user's identity, in some implementations, the message generated and sent by the message generation module 310 may include text similar to "Sorry, [name of trusted contact] was unable to verify your identity. Therefore, your account recovery request has been denied." For another example, assume the user entered a new password when the user composed the personalized message and the trusted contact verified the user's identity, in some implementations, the message generated and sent by the message generation module 310 may include text similar to "Congrats, [name of trusted contact] has verified your identity, and you may recover your account with your new password."

In some implementations, the message enables the user to recover the user's account. Examples of messages that enable the user to recover his/her account include but are not limited to one or more of a message that includes an account recovery code, a message that includes a hyperlink to a website where the user may create a new password, a message that includes a new password, a message that includes a temporary password, a message that includes instructions for completing account recovery, and includes any other means of regaining access to the user account. It will be recognized that the preceding are merely examples of how a message may enable the user to recover an account and that other examples exist.

In some implementations, a message is generated and sent by the message generation module 310 when the response from the at least one selected trusted contact verifies the user's identity. For example, a message enabling the user to regain access is generated and sent when a trusted contact verifies the user's identity. In some implementations, a message is sent only when the response from the at least one selected trusted contact verifies the user's identity. For example, a message enabling the user to regain access is only generated and sent when a trusted contact verifies the user's identity.

In another implementation, a message is sent regardless of whether the response from the at least one selected trusted contact verifies the user's identity. In one such implementation, however, the content of the message differs based at least in part on whether the user's identity was verified by the at least one selected trusted contact. For example, a message enabling the user to regain access is generated and sent when a trusted contact verifies the user's identity and a message serves notice to the user when the trusted contact has failed to verify the user's identity.

The message generation module 310 sends the message to the user. In some implementations, the message is sent such that it is presented to the user via the display of the user's user device 115. Examples of methods of sending the message include but are not limited to via SMS message, via a secondary e-mail, via a telephone, via an instant message, etc. It will be recognized that the preceding are merely examples of methods of sending the message and that other examples exist. In some implementations, the message is sent using the alternate contact method.

In some implementations, the message generation module 310 sends the generated message to the user, e.g., via the user's user device 115. For example, the message generation module 310 is communicatively coupled to the user device 115 to send the generated message to the user device 115. In another implementation, the message generation module 310 (or the communication interface 302) stores the generated message in the storage device 214 (or any other non-transitory storage medium communicatively accessible). The other components of the system 100 including the user device 115 can retrieve the generated message by accessing the storage device 214 (or other non-transitory storage medium.

Figure 6:
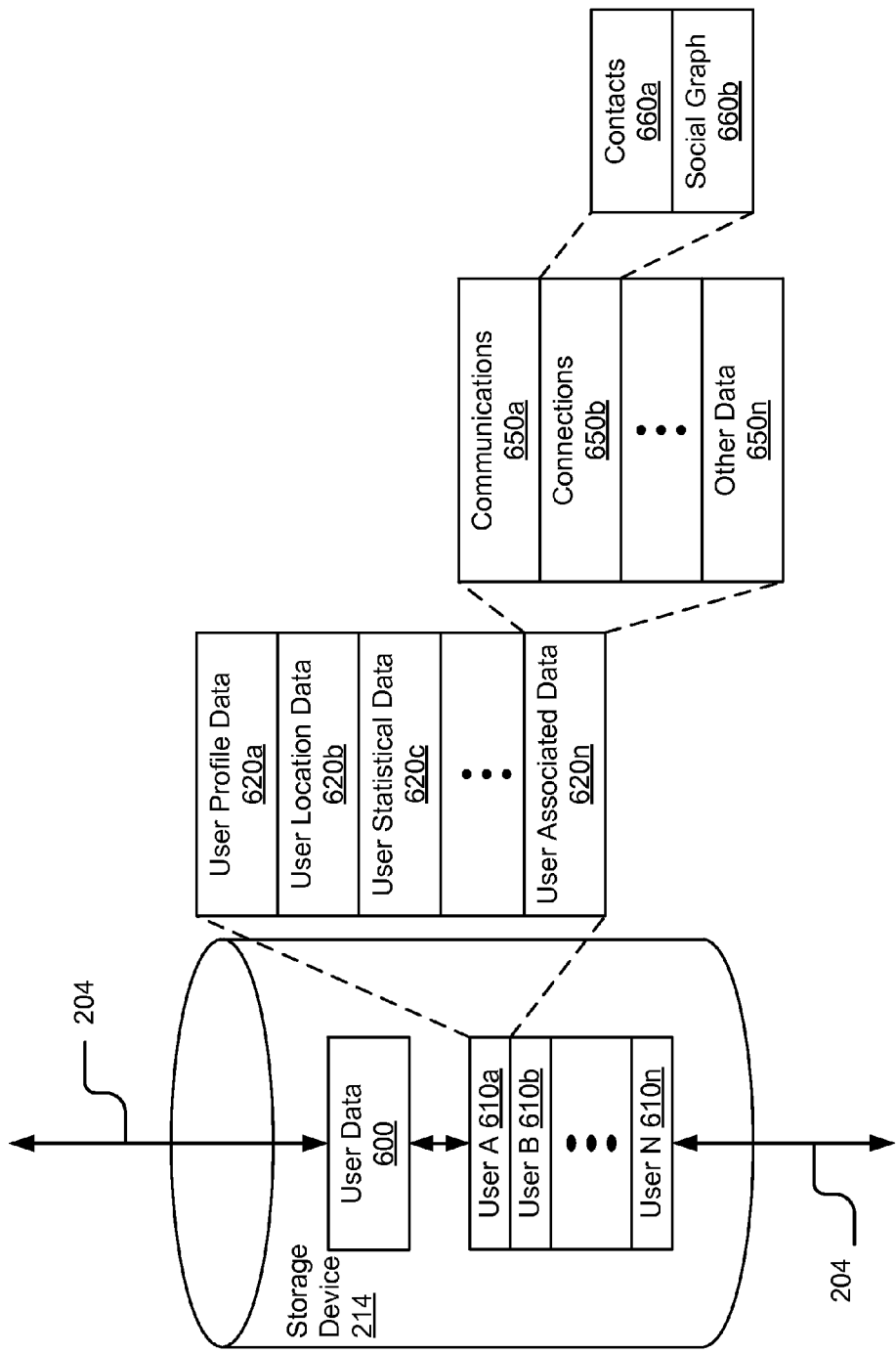
FIG. 6 is a block diagram illustrating a storage device storing data sets including account owner data on a storage device in the system, which may be utilized to recover an account based at least in part on peer attestation according to one implementation.

FIG. 6 illustrates an example of a storage device 214 storing user data 600 including data belonging to account owner User A 610a. In this example, User A's data 610a includes data for the User A's profile 620a, location 620b, user statistics 620c, as well as other data 620n associated with User A. In some implementations, the other data associated with User A 620n includes data regarding User A's communications 650a, connections 650b and other data 650n. The connections data 650b includes data regarding the user's contacts 660a and social graph 660b according to one implementation. In some implementations, the user's contacts 660a is the contact database of User A. It will be recognized that although User A's data 610a is shown comprising a data structure comprising multiple other types of data, the data for other users, e.g., User B's data 610b and User N's data 610n, may comprise the same or similar data structures and data. It will be further recognized that the preceding is merely an example of the kind of data and data structure possible in a storage device 214 and that other examples exist. For example, in some implementations, the data structure may be different and/or include more, less, different or other data types and categories.

Figure 4:
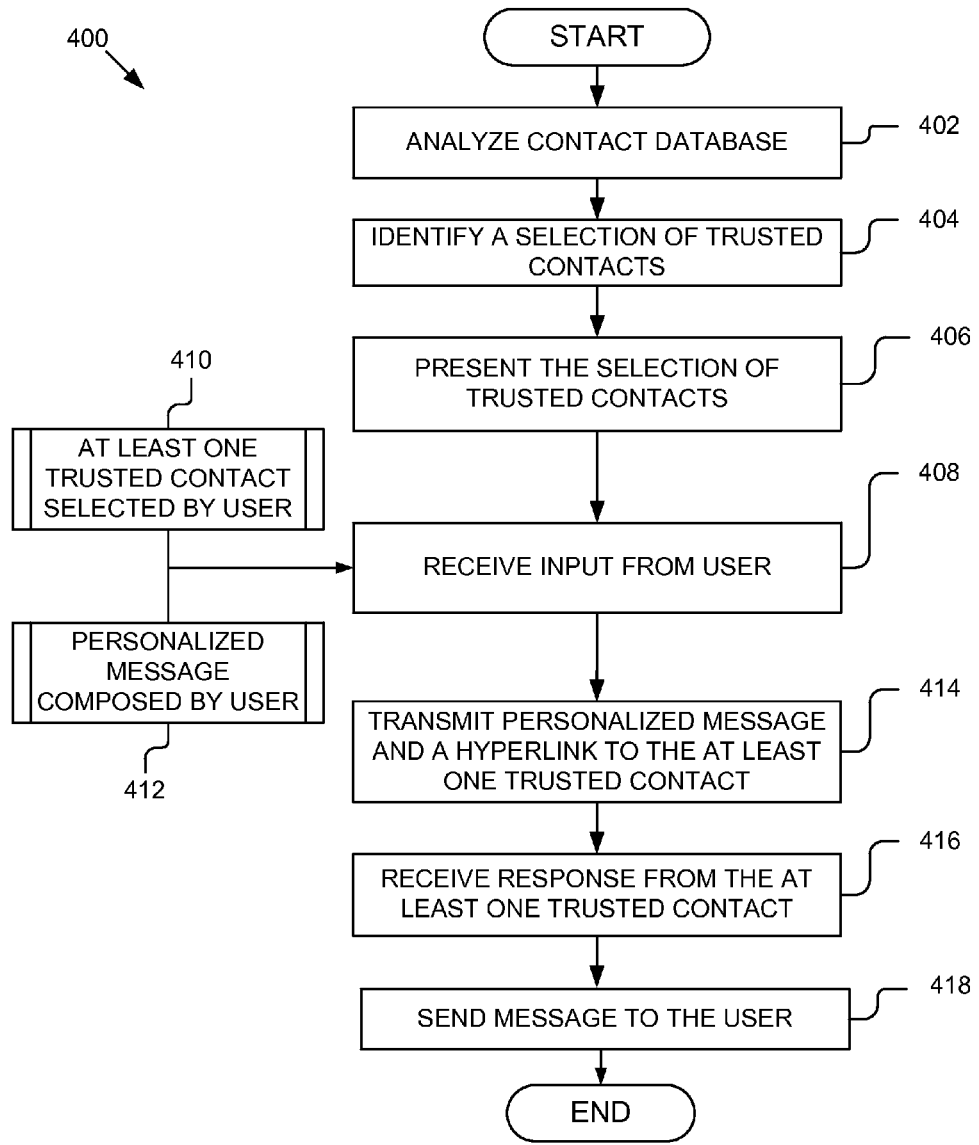
FIG. 4 is a flow chart illustrating a method for recovering an account based at least in part on peer attestation according to one implementation.
Figure 5:
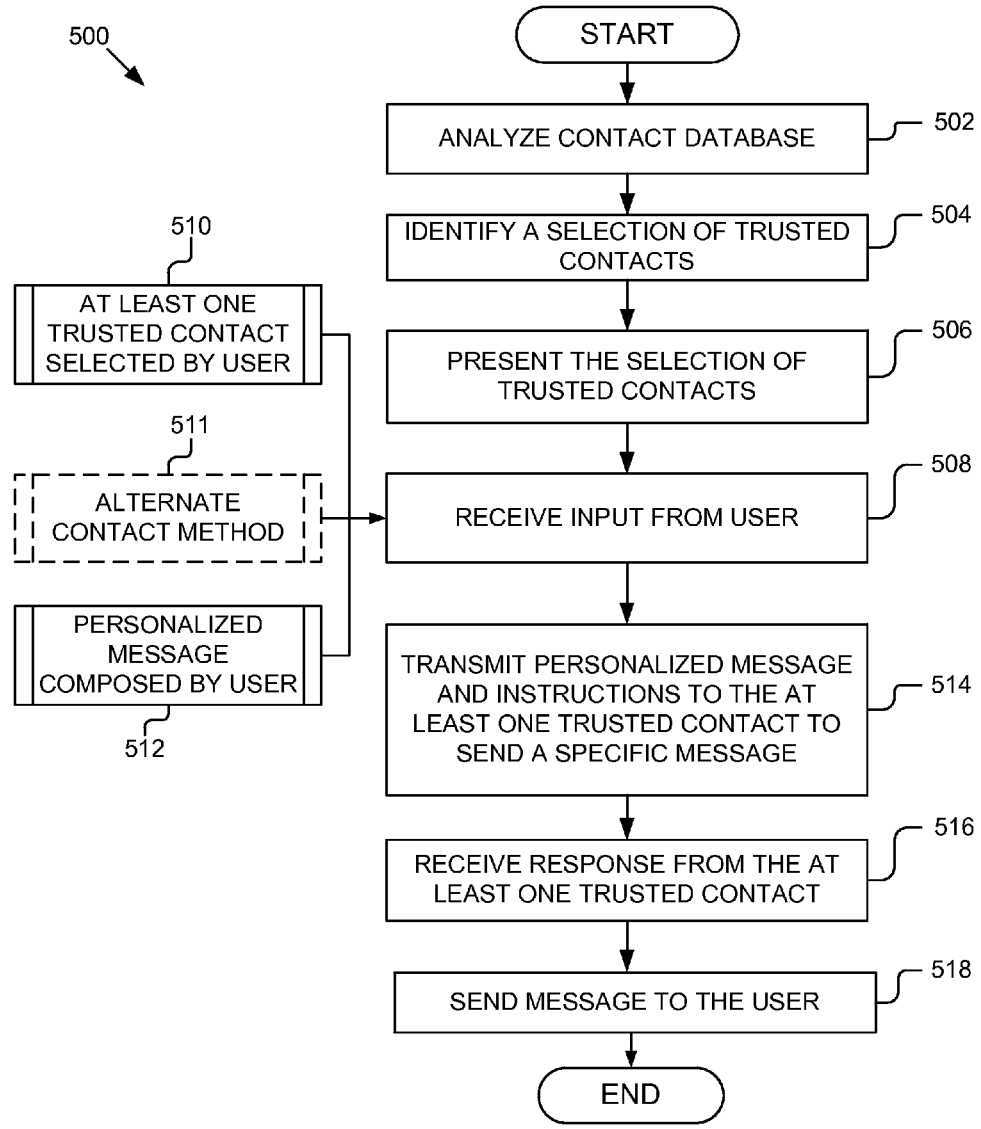
FIG. 5 is a flow chart illustrating another method for recovering an account based at least in part on peer attestation according to another implementation.

FIGS. 4 and 5 depict various methods 400, 500 performed by the system described above in reference to FIGS. 1-3 and 6. Steps that are optional and/or performed by optional modules are depicted in dashed boxes.

FIG. 4 is a flow chart illustrating a method 400 for recovering an account based at least in part on peer attestation according to one implementation. At step 402, the trusted contact identifier module 304 of the account recovery module 220 analyzes the contact database of a user. At step 404, the trusted contact identifier module 304 identifies a selection of trusted contacts. At step 406, the user interaction module 306 presents the selection of identified trusted contacts to the user. At step 408, the user interaction module 306 receives input from the user, which, according to the illustrated implementation, may include the at least one trusted contact selected by the user and a personalized message composed by the user as shown by steps 410 and 412, respectively. At step 414, the trusted contact interaction module 308 transmits the personalize message of step 412 and a hyperlink to the at least one trusted contact selected by the user at step 410. At step 416, the trusted contact interaction module 308 receives a response from the at least one contact selected by the user at step 410. At step 418, the message generation module 310 sends a message to the user responsive to the response received from the trusted contact in step 416.

FIG. 5 is a flow chart illustrating another method 500 for recovering an account based at least in part on peer attestation according to one implementation. At step 502, the trusted contact identifier module 304 of the account recovery module 220 analyzes the contact database of a user. At step 504, the trusted contact identifier module 304 identifies a selection of trusted contacts. At step 506, the user interaction module 306 presents the selection of identified trusted contacts to the user.

At step 508, the user interaction module 306 receives input from the user, which, according to the illustrated implementation, may include the at least one trusted contact selected by the user, an optional alternate contact method and a personalized message composed by the user as shown by steps 510, 511 and 512, respectively. At step 514, the trusted contact interaction module 308 transmits the personalize message of step 512 and instructions to send a specific message to the at least one trusted contact selected by the user at step 510. At step 516, the trusted contact interaction module 308 receives a response from the at least one contact selected by the user at step 410. At step 518, the message generation module 310 sends a message to the user responsive to the response received from the trusted contact in step 516. In some implementations, the message is sent 518 using the optional alternate contact method input in step 511.

Figure 7:
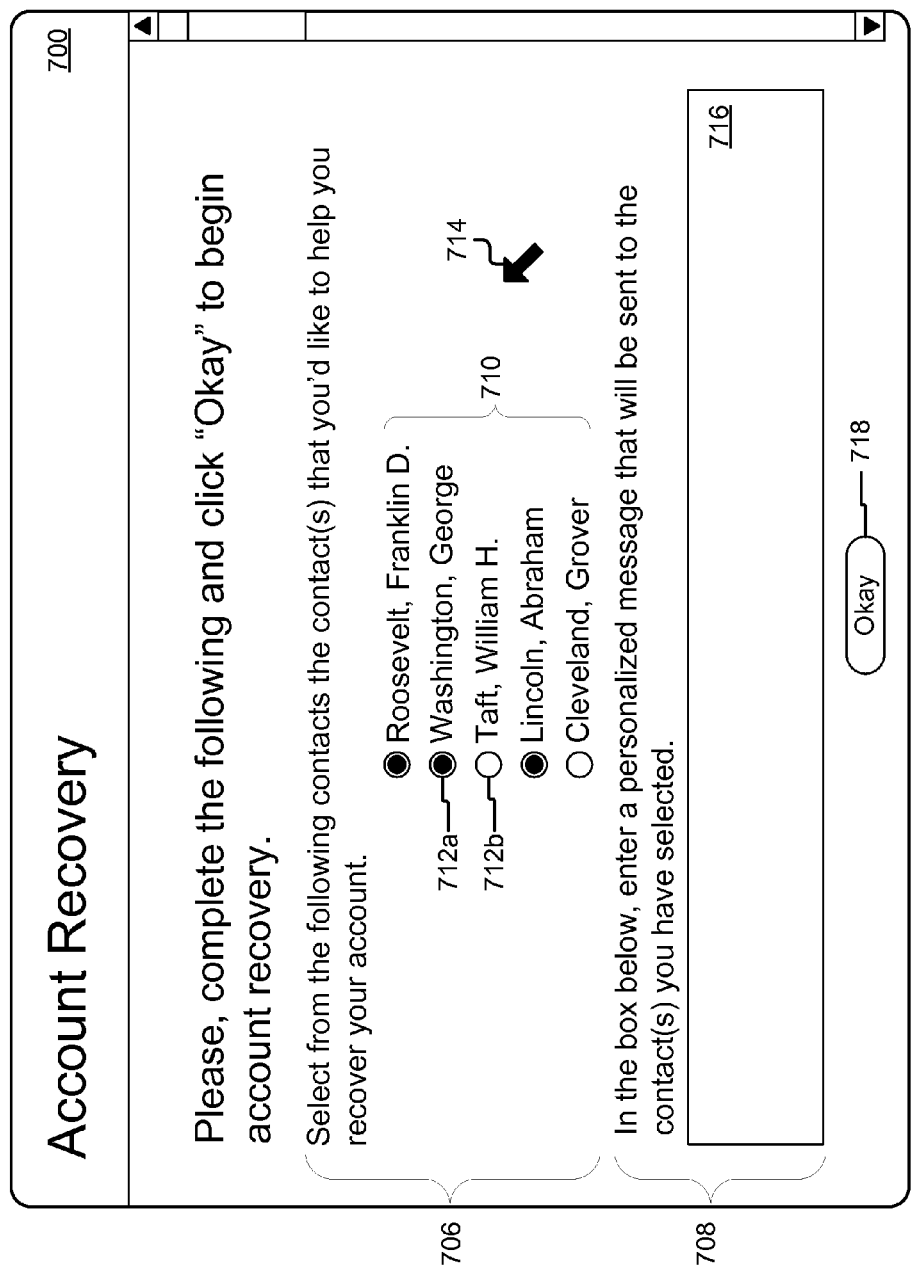
FIG. 7 is a graphic representation of an example of a user interface displaying an interface for interacting with the user according to one implementation.

FIG. 7 is a graphical representation of an example of an interface 700 for interacting with the user according to one implementation. In the illustrated implementation, the interface 700 presents the selection of trusted contacts to the user in section 706 and receives input comprising a personalized message composed by the user in section 708. In some implementations, section 706 comprises an instruction to the user to select at least one contact from the selection of contacts that is presented to the user as a list 710. The interface also receives user input comprising a selection of at least one trusted contact and a personalized message composed by the user. For example, the user may select at least one trusted contact in the list 710 using the input device 714. The input device 714 has been used to select "Washington, George," which is indicated, in some implementations, by the selection circle 712a being filled in, and "Taft, William H." has not been selected as is indicated, in some implementations, by the selection circle 712b being empty. In the illustrated implementation, section 708 comprises an instruction instructing the user to compose a personalized message and a text field 716 for receiving the composed personalized message. Once the user has input at least one selected trusted contact and a personalized message the user may select the "Okay" button 718 to proceed with account recovery.

The foregoing description of the implementations has been presented for the purposes of illustration and description. It is not intended to be exhaustive or to limit the present implementations to the precise forms disclosed. Many modifications and variations are possible in light of the above teaching. It is intended that the scope of the present implementations be limited not by this detailed description, but rather by the claims of this application. As will be understood by those familiar with the art, the present implementations may take other specific forms without departing from the spirit or essential characteristics thereof. Likewise, the particular naming and division of the modules, routines, features, attributes, methodologies and other aspects are not mandatory or significant, and the mechanisms that implement one implementation or its features may have different names, divisions and/or formats. Furthermore, as will be apparent, the modules, routines, features, attributes, methodologies and other aspects of the implementations can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the implementations are in no way limited to implementation in any specific programming language, or for any specific operating system or environment. Accordingly, the disclosure is intended to be illustrative, but not limiting, of the scope, which is set forth in the following claims.

What is claimed is:

1. A computer-implemented method, the method comprising:
    analyzing a contact database of a user, wherein the contact database is associated with a user account;
    identifying, from the contact database, a selection of trusted contacts based on communication between the trusted contacts and the user, wherein the selection of trusted contacts satisfied a predefined criteria;
    presenting to the user the selection of trusted contacts and an instruction to select at least one of the contacts from the selection;
    receiving an input from the user, wherein the input includes at least one selected trusted contact and a personalized message composed by the user, wherein the personalized message includes particular information of the user;
    transmitting, to the at least one selected trusted contact, the personalized message and a request to verify the identity of the user;
    receiving, from the at least one selected trusted contact, a response to the request, the response indicating whether the identity of the user is verified by the at least one selected trusted contact; and
    in response to receiving the response, sending a message to the user.

2. The method of claim 1 wherein identifying the selection of trusted contacts is based on one or more of the frequency of communication between the user and the trusted contact, recentness of communication between the user and the trusted contact, two-way communication between the user and the trusted contact, the user's identified relationship with the trusted contact and how long the user has known the trusted contact.

3. The method of claim 1, wherein the particular information of the user identifies the user to the at least one selected trusted contact.

4. The method of claim 1, wherein the input from the user further comprises one or more of an alternate contact method and a new password, which, subject to the at least one selected trusted contact attesting to the user's identity, enable the user to regain access to the user's account.

5. The method of claim 3, wherein the message sent to the user is sent using the alternate contact method.

6. The method of claim 1, wherein the message sent to the user is sent via one or more of a SMS message, instant message, a secondary e-mail and a telephone.

7. The method of claim 1, wherein instead of, or in addition to, the request, the personalized message includes instructions for the at least one selected trusted contact to send a specific message and the response includes whether the at least one selected trusted contact sends the specific message.

8. The method of claim 7, wherein the specific message includes a random string.

9. A computer program product comprising a non-transitory computer readable medium encoding instructions that, in response to execution by a computing device, cause the computing device to perform operations comprising:
    analyzing a contact database of a user, wherein the contact database is associated with a user account;
    identifying, from the contact database, a selection of trusted contacts based on communication between the trusted contacts and the user, wherein the selection of trusted contacts satisfied a predefined criteria;
    presenting to the user the selection of trusted contacts and an instruction to select at least one of the contacts from the selection;
    receiving an input from the user, wherein the input includes at least one selected trusted contact and a personalized message composed by the user, wherein the personalized message includes particular information of the user;
    transmitting the personalized message and a hyperlink to the at least one selected trusted contact, wherein the hyperlink directs the at least one selected trusted contact to a website for verifying the identity of the user;
    receiving, from the at least one selected trusted contact using the website, a response indicating whether the identity of the user is verified by the at least one selected trusted contact; and
    in response to receiving the response, sending a message to the user.

10. The computer program product of claim 9, wherein identifying the selection of trusted contacts is based on one or more of the frequency of communication between the user and the trusted contact, recentness of communication between the user and the trusted contact, two-way communication between the user and the trusted contact, the user's identified relationship with the trusted contact and how long the user has known the trusted contact.

11. The computer program product of claim 9, wherein the particular information of the user identifies the user to the at least one selected trusted contact.

12. The computer program product of claim 9, wherein the input from the user further comprises one or more of an alternate contact method and a new password, which, subject to the at least one selected trusted contact attesting to the user's identity, enable the user to regain access to the user's account.

13. The computer program product of claim 12, wherein the message sent to the user is sent using the alternate contact method.

14. The computer program product of claim 9, wherein the message sent to the user is sent via one or more of a SMS message, instant message, a secondary e-mail and a telephone.

15. The computer program product of claim 9, wherein instead of, or in addition to, the hyperlink, the personalized message includes instructions for the at least one selected trusted contact to send a specific message and the response includes whether the at least one selected trusted contact sends the specific message.

16. The method of claim 15, wherein the specific message includes a random string.

17. A system for recovering user profiles, the system comprising:
    one or more processors; and
    a memory storing instructions that, when executed, cause the system to:
        analyze a contact database of a user, wherein the contact database is associated with a user account;
        identify, from the contact database, a selection of trusted contacts based on communication between the trusted contacts and the user, wherein the selection of trusted contacts satisfied a predefined criteria;
        present to the user the selection of trusted contacts and an instruction to select at least one of the contacts from the selection;
        receive an input from the user, wherein the input includes at least one selected trusted contact and a personalized message composed by the user, wherein the personalized message includes particular information of the user;

transmit the personalized message and a hyperlink to the at least one selected trusted contact, wherein the hyperlink directs the at least one selected trusted contact to a website for verifying the identity of the user;

receive, from the at least one selected trusted contact using the website, a response indicating whether the identity of the user is verified by the at least one selected trusted contact; and in response to receiving the response, send a message to the user.

18. The system of claim 17, wherein identifying the selection of trusted contacts is based on one or more of the frequency of communication between the user and the trusted contact, recentness of communication between the user and the trusted contact, two-way communication between the user and the trusted contact, the user's identified relationship with the trusted contact and how long the user has known the trusted contact.

19. The system of claim 17, wherein the particular information of the user identifies the user to the at least one selected trusted contact.

20. The system of claim 17, wherein the input from the user further comprises one or more of an alternate contact method and a new password, which, subject to the at least one selected trusted contact attesting to the user's identity, enable the user to regain access to the user's account.

* * * * *